(12) United States Patent
Zia et al.

(10) Patent No.: US 10,859,889 B2
(45) Date of Patent: Dec. 8, 2020

(54) SYSTEMS, METHODS, AND STRUCTURES FOR IMPROVED SUPERCONTINUUM GENERATION

(71) Applicant: Universiteit Twente, Enschede (NL)

(72) Inventors: Haider Zia, Hengelo (NL); Klaus-Jochen Boller, Lingen (DE)

(73) Assignee: Universiteit Twente, Enschede (NL)

( * ) Notice: Subject to any disclaimer, the term of this patent is extended or adjusted under 35 U.S.C. 154(b) by 0 days.

(21) Appl. No.: 16/204,614

(22) Filed: Nov. 29, 2018

(65) Prior Publication Data

US 2020/0174339 A1    Jun. 4, 2020

(51) Int. Cl.
*G02F 1/365* (2006.01)
*G02B 6/24* (2006.01)
*G02F 1/35* (2006.01)
*H04B 10/2531* (2013.01)

(52) U.S. Cl.
CPC .............. *G02F 1/365* (2013.01); *G02B 6/24* (2013.01); *H04B 10/2531* (2013.01); *G02F 2001/3528* (2013.01)

(58) Field of Classification Search
CPC .. G02F 1/365; G02F 2001/3528; G02F 1/353; G02F 1/39; G02B 6/00; G02B 6/14; G02B 6/24; G02B 6/28; G01D 5/353; H04B 10/2531; H04B 2210/258
USPC ...................... 385/122, 123, 129, 24, 27, 39
See application file for complete search history.

(56) References Cited

U.S. PATENT DOCUMENTS

| | | |
|---|---|---|
| 5,999,548 A | 12/1999 | Mori et al. |
| 9,110,219 B1 | 8/2015 | Zhang et al. |
| 2003/0039006 A1* | 2/2003 | Carbone ............ H04B 10/2531 398/79 |
| 2005/0047739 A1 | 3/2005 | Parket et al. |

FOREIGN PATENT DOCUMENTS

EP    2154566 A1    2/2010

OTHER PUBLICATIONS

Authorized Officer: Beugin, Anne, International Search Report and Written Opinion issued in counterpart PCT application No. PCT/IB2018/059532, dated Jul. 23, 2019, 13 pp.

* cited by examiner

*Primary Examiner* — Michael P Mooney
(74) *Attorney, Agent, or Firm* — Kaplan Breyer Schwarz, LLP

(57) ABSTRACT

Aspects of the present disclosure describe improved supercontinuum generation based upon alternating optical dispersion along a waveguide length that advantageously generates much more spectral bandwidth than possible with conventional, prior art techniques without losing coherence as well as supporting a larger range of pulse energies (i.e., for lower than conventionally allowed pulse energies or high pulse energies).

18 Claims, 16 Drawing Sheets

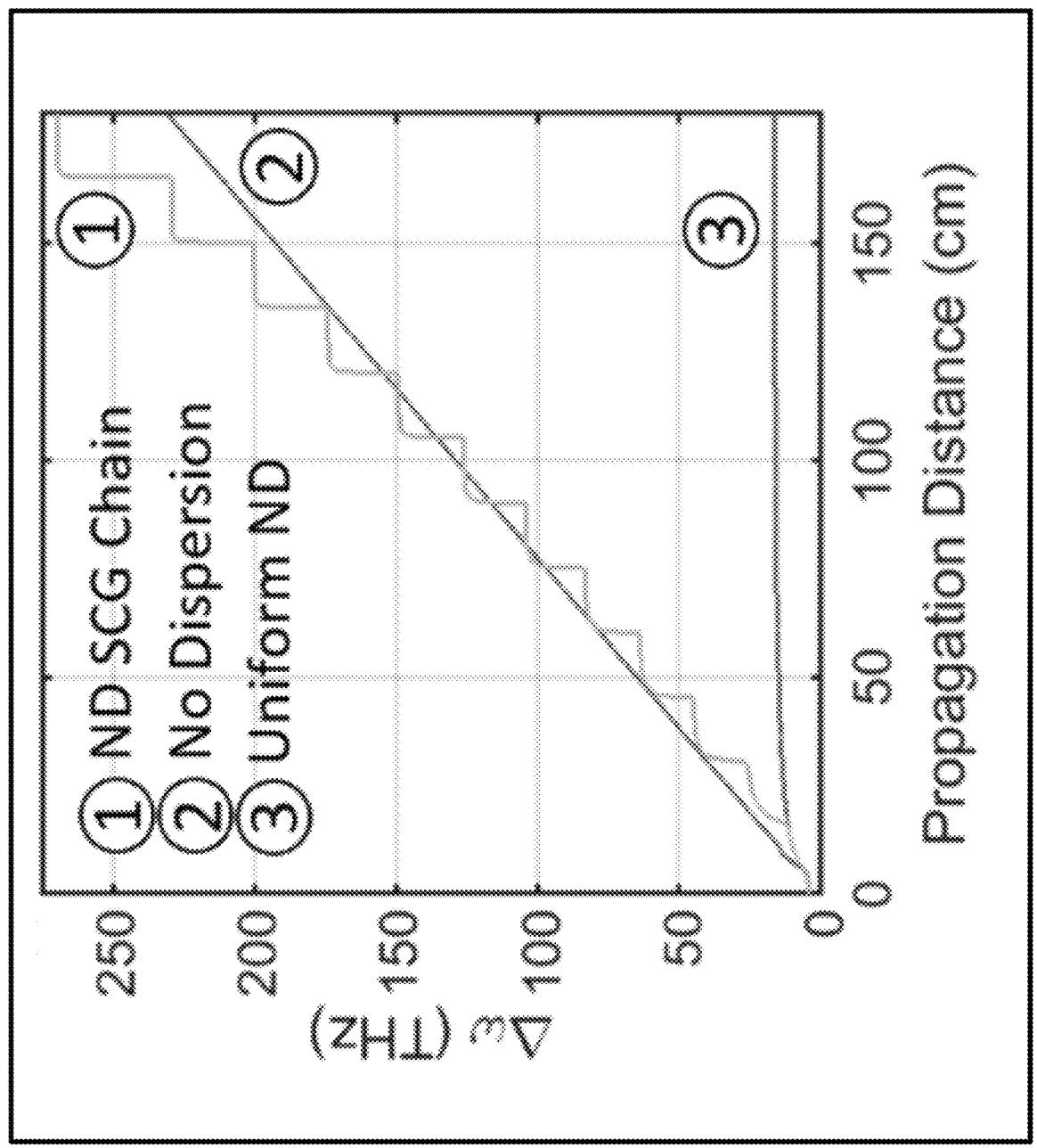

SYSTEMS, METHODS, AND STRUCTURES FOR IMPROVED SUPERCONTINUUM GENERATION

TECHNICAL FIELD

This disclosure relates generally to systems, methods, and structures for improved supercontinuum generation (SCG).

BACKGROUND

Recently, supercontinuum generation—a process by which laser light is converted to light exhibiting a very broad spectral bandwidth, i.e., a very low temporal coherence and a super-wide continuous optical spectrum—has become of great interest as such supercontinuum sources have found applicability in a wide array of important contemporary applications including medical diagnostics, environmental detection/analysis, light detection and ranging (LiDAR), and optical communications such as via frequency combs—among others.

Given the utility, importance, and necessity of supercontinuum generation to such applications, systems, methods, and structures for improve supercontinuum generation would represent a welcome addition to the art.

SUMMARY

An advance in the art is made according to aspects of the present disclosure directed to systems, methods, and structures for improved supercontinuum generation that advantageously and repeatedly re-shapes pulse(s) during, before or after nonlinear generation such that it maintains an ideal temporal shape for enhanced spectral generation.

Advantageously, systems, methods, and structures according to the present disclosure increase the spectral bandwidth of SCG well beyond those achieved in the art, while maintaining coherence in generation.

In sharp contrast to the prior art—instead of maintaining a spatially uniform or tapered waveguide dispersion along the propagation length—systems, methods, and structures according to aspects of the present disclosure alternate the dispersion of a length of waveguide via changing (alternating) segments of normal and anomalous dispersion waveguide segments.

By configuring a chain of such alternating segments with an appropriate length distribution, systems, methods, and structures according to the present disclosure advantageously and surprisingly impose alternating temporal focusing and defocusing thereby avoiding soliton formation, spectral narrowing, as well as loss of peak intensity, while self-phase modulation increases the spectral bandwidth without undesirable spectral clamping.

BRIEF DESCRIPTION OF THE DRAWING

A more complete understanding of the present disclosure may be realized by reference to the accompanying drawing in which:

FIG. 2(A) is a plot showing the comparison of the spectral development in each ND segment along the propagation direction of the ND SCG chain with an equivalent length case of just the ND waveguide wherein dispersion is not present but nonlinearity remains and the equivalent length case wherein there is only a continuous length of the ND material with both dispersion and nonlinearity. Note that the dispersion chosen is considered to be within a standard range for step-index fibers and is thus not a negligible value according to aspects of the present disclosure;

FIG. 7(A)-FIG. 7(E) are schematic diagrams of illustrative waveguide configurations providing SCG of optical pulses that may advantageously and illustratively implemented in integrated waveguide structures employing contemporary processes and materials according to aspects of the present disclosure in which: FIG. 7(A) is a first case illustrative configuration; FIG. 7(B) is a second case illustrative configuration; FIG. 7(C) is a third case illustrative configuration; FIG. 7(D) shows illustrative parameters of waveguide structures; a plot illustrating relative spectral energy density (dB) vs. wavelength (µm) for an output spectrum measured behind each ND segment in the chain according to aspects of the present disclosure; FIG. 7(E) shows cross-sectional views of illustrative waveguides;—all according to aspects of the present disclosure.

Figure 1A:
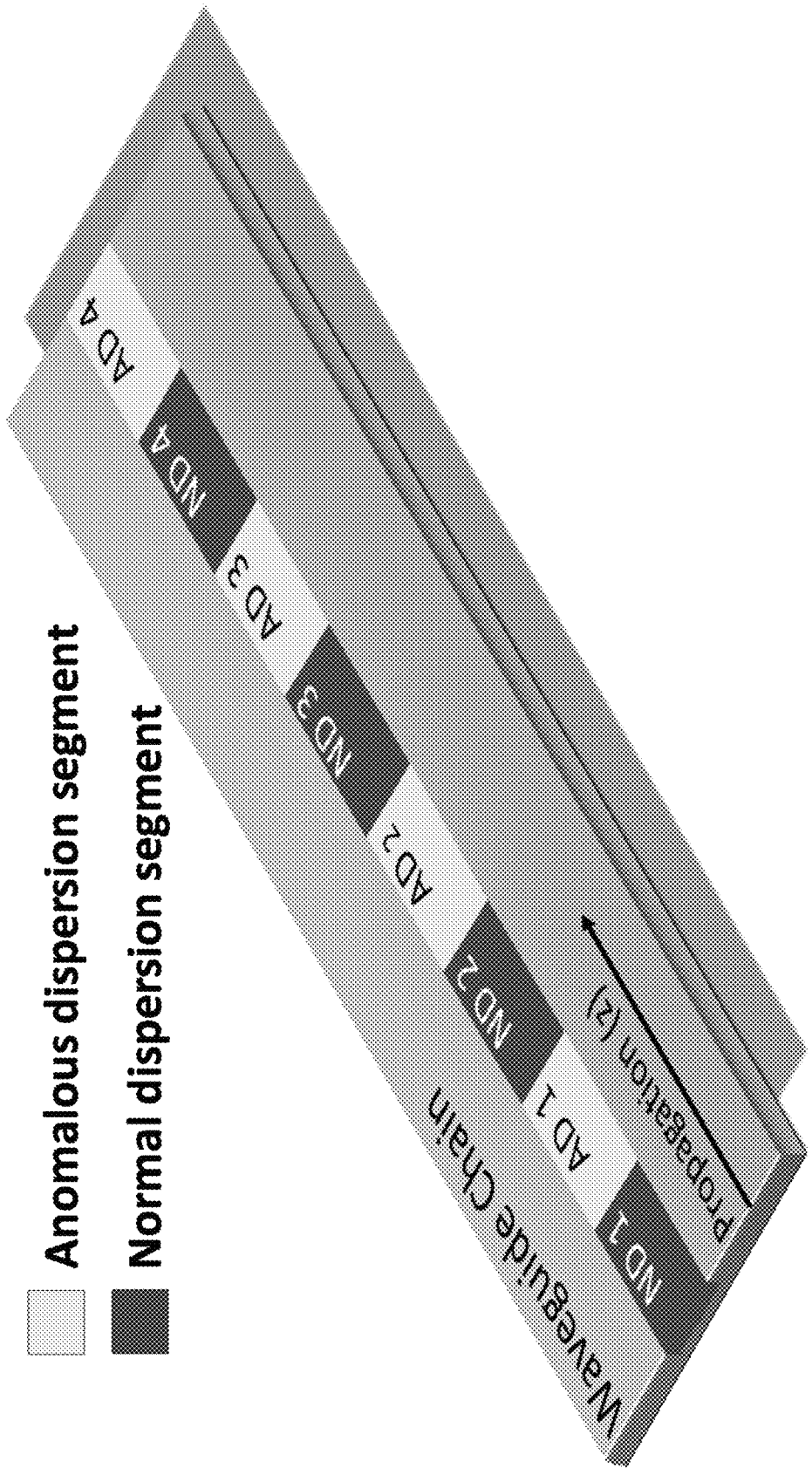
FIG. 1(A) is a schematic diagram illustrating supercontinuum generation in a generic waveguide (e.g., integrated or fiber waveguide) having a chain of segments of alternating normal dispersion (ND) and anomalous dispersion (AD) according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

As those skilled in the art will appreciate upon understanding our disclosure, we present a new approach to supercontinuum generation that alternates the sign, and with it possibly also the shape and strength, of dispersion along a length of a waveguide. We demonstrate our technique by showing a substantial bandwidth enhancement in a standard, step-index fiber including a chain of fiber segments configured such that dispersion alternates repeatedly between normal and anomalous. As we disclose, systems, methods and structures for supercontinuum generation—according to the present disclosure—are particularly well suited for integrated optical supercontinuum generation and the plethora of applications that arise from such advancement.

We begin by noting supercontinuum generation (SCG) in waveguides is one of the most intriguing phenomena in non-linear optics due to its unique potential for combining broad spectral bandwidth with high coherence and power efficiency. Of particular interest and advantage, output may be spectrally centered in the mid-infrared to ultraviolet regions as determined by specific optical materials, waveguide dispersion, and pump laser wavelength employed.

Contemporary SCG involves a single-pass nonlinear conversion in optical fibers providing usually negative (anomalous) group velocity dispersion, possibly also positive (normal) group velocity dispersion. More recently SC has been generated in integrated optical waveguides as well. In certain resonant systems the same underlying phenomena form the basis for broadband frequency comb generation (Kerr comb generation). In each of these situations, achieving an output exhibiting a large bandwidth and high coherence is necessary when employing same in such applications as microwave photonics, sensing and precision metrology.

As those skilled in the art will understand and appreciate however, while the spectral bandwidth in SCG can reach even several hundreds of THz in specific cases while realizing a high conversion efficiency, ultimately, the bandwidth remains clamped, that is to say it cannot exceed a certain range without significant loss of coherence. When employing anomalous dispersion—which is a common technique used in broadband SCG—the process initially benefits from dispersive pulse compression (temporal focusing), but spectral clamping is inherent to subsequent soliton formation.

Beyond these limits, it is known that further broadening can be achieved via employing Raman interaction, four-wave mixing and dispersive wave (DW) generation. Unfortunately, these processes generate either narrowband radiation (DW) or are prone to low coherence, e.g., due to the influence of vacuum fluctuations, modulation instability, or stochastic soliton fission. And while solitons are not formed when employing normal dispersion in SCG, however, spectral clamping remains inherent because pump pulses become temporally stretched (defocused) and lose their peak intensity with increasing propagation length.

Alternating Dispersion Supercontinuum Generation

Accordingly, we disclose and describe herein a novel approach for increasing the spectral bandwidth of SCG—and surprisingly—well beyond named limits, while maintaining coherence in generation.

Such SCG is realized according to aspects of the present disclosure—in sharp contrast to prior art techniques that generally maintain a spatially uniform or tapered waveguide dispersion along a propagation length—by alternating the dispersion via changing waveguide segments of normal (ND segment) and anomalous dispersion (AD segment) as shown schematically in FIG. 1(A).

More specifically, FIG. 1(A) is a schematic diagram illustrating supercontinuum generation in a generic waveguide (e.g., integrated or fiber waveguide) having a chain of segments of alternating normal dispersion (ND) and anomalous dispersion (AD) according to aspects of the present disclosure. Note that while the figure shows the ND segment initially preceding the AD segment, our disclosure is not so limited, and such will be disclosed and discussed in more detail subsequently.

Figure 1B:
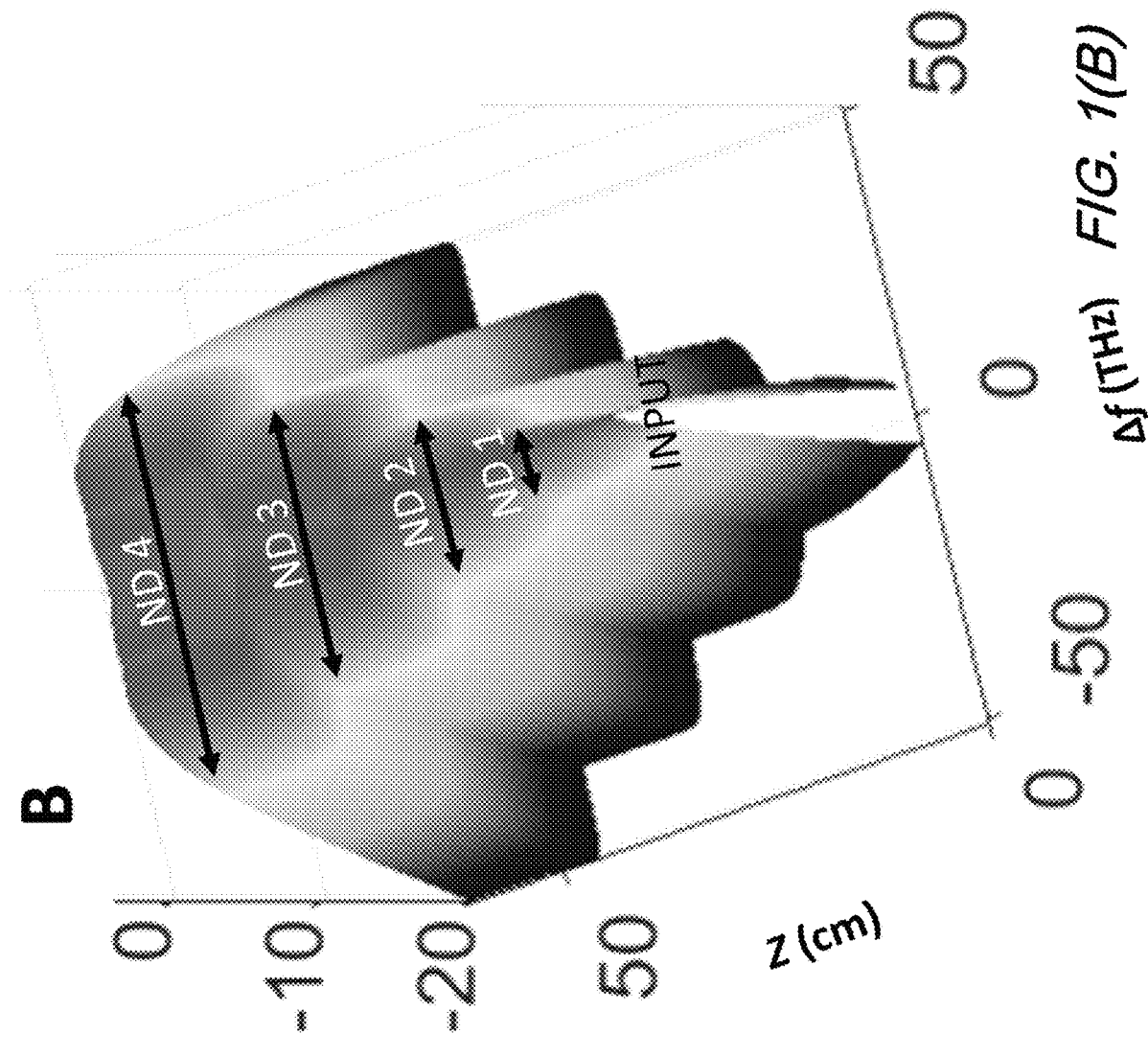
FIG. 1(B) is a plot illustrating broadening of an energy density spectrum vs. propagating through a chain of AD and ND segments, calculated for the example of a transform-limited Gaussian input pulse when only first and second order dispersion is present according to aspects of the present disclosure.

FIG. 1(B) is a plot illustrating broadening of an energy density spectrum vs. propagating through a chain of AD and ND segments, calculated for the example of a transform-limited Gaussian input pulse when only first and second order dispersion is present according to aspects of the present disclosure.

Figure 1C:
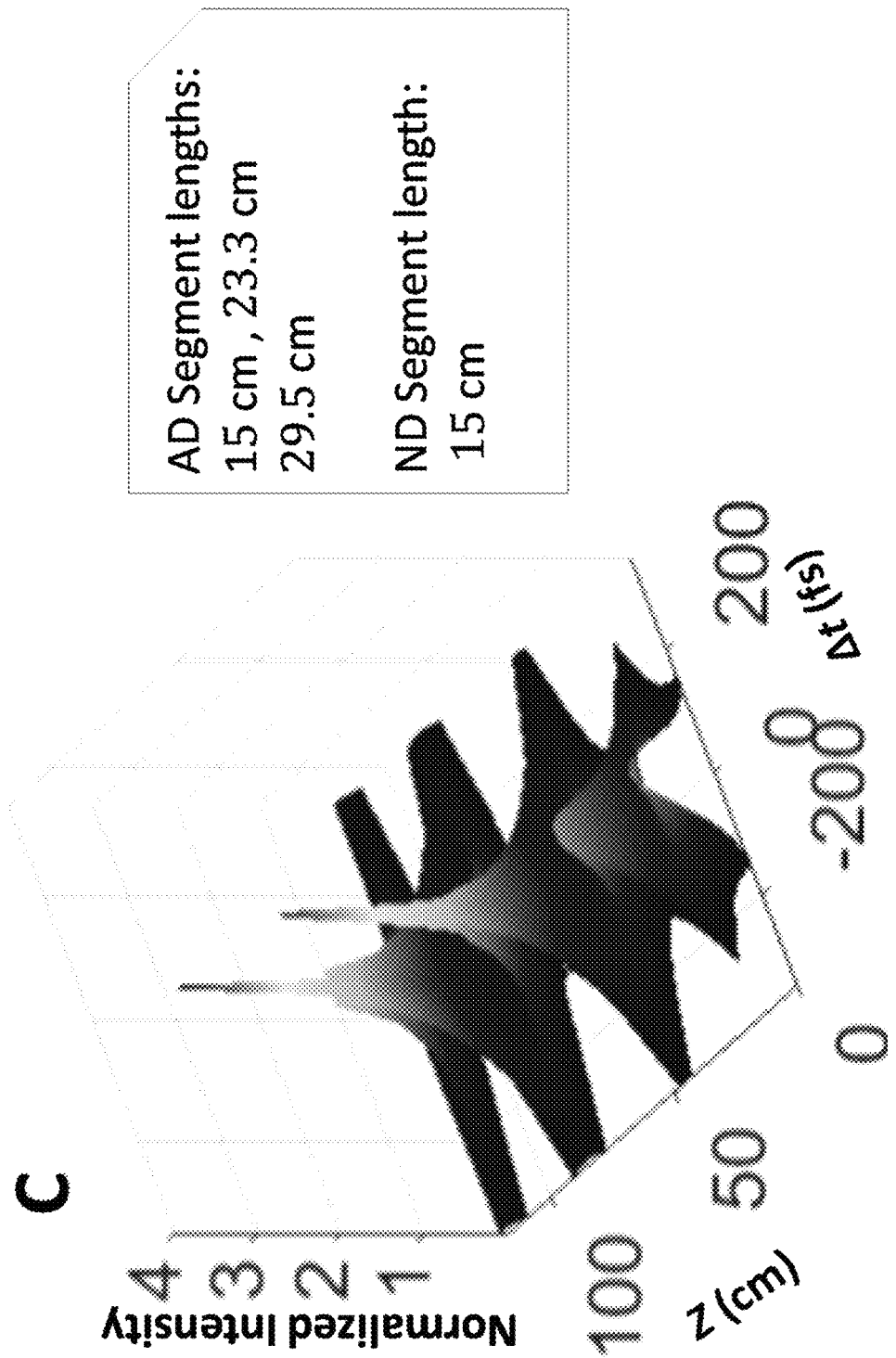
FIG. 1(C) is a plot illustrating the temporal shape of an example pulse as in FIG. 1(B), calculated in a travelling frame vs. propagation coordinate, accounting up to second order dispersion according to aspects of the present disclosure.

FIG. 1(C) is a plot illustrating the temporal shape of an example pulse as in FIG. 1(B), calculated in a travelling frame vs. propagation coordinate, accounting up to second order dispersion according to aspects of the present disclosure.

With initial reference now to FIG. 1(A)—as noted—there is shown a schematic diagram illustrating a waveguide structure according to aspects of the present disclosure. As may be observed from that figure, a "chain" of waveguide segments is configured such that the segments alternate between normal dispersion (ND) segments and anomalous dispersion (AD) segments as one progresses along the overall waveguide length. In the illustrative configuration shown, SPM spectral broadening will occur primarily in the ND segments.

At this point we note that as used herein, a waveguide is any structure that guides waves, such as electromagnetic waves, with minimal loss of energy by restricting expansion to selected dimension(s). Of particular interest to this disclosure—are optical waveguides that guide electromagnetic waves in an optical portion of the electromagnetic spectrum. Such optical waveguides include both optical fiber and rectangular as well as non-rectangular (i.e., integrated) waveguides that are constructed to be spatially inhomogeneous such that the spatial region in which light propagates therein is restricted. As will be known by those skilled in the art, such optical waveguides will include a region exhibiting a different refractive index from surrounding region(s).

We further note—with respect to the illustrative figures—that as shown illustratively is an ND segment as the first segment in the chain of segments. Those skilled in the art will know and appreciate that the characteristic of the first segment may be either ND or AD, so long as the alternating characteristic along the length of the waveguide structure is maintained. As we shall describe further, which particular segment provides focusing and which provides defocusing will be a matter of design choice and configuration according to aspects of the present disclosure.

As we shall show and describe, systems, methods, and structures employing dielectric waveguides or more specifically planar optical waveguides may advantageously be employed according to the present disclosure. Such planar waveguide structures benefit significantly from silicon waveguide processing techniques, processes, and materials that continue to advance at an accelerating pace.

Finally, with returning reference to FIG. 1(A), we note that by choosing a chain of such alternating segments exhibiting an appropriate length distribution, we impose alternating temporal focusing and defocusing that advantageously avoids both soliton formation as well as loss of peak intensity, while increasing self-phase modulation of spectral bandwidth without producing spectral clamping.

To illustratively demonstrate our approach, we show a bandwidth enhancement of SC generation in a dispersion segmented optical fiber chain configured according to aspects of the present disclosure. Note that such demonstration is only illustrative and in no way limiting.

Those skilled in the art will readily understand and appreciate that salient effects of SCG important to our approach include self-phase modulation (SPM), dispersion, and the dynamics resulting from the interplay of these two effects. Via the intensity-dependent Kerr effect, SPM generates a coherent broadening in the spectral domain that depends on the peak intensity, pulse duration and propagation distance. To maximize spectral broadening by SPM, the pulse duration must be minimized, and the peak intensity maximized. However, in the presence of AD, the temporal profile can shape itself into a soliton pulse, where the temporal chirp contributions of SPM become balanced with that of dispersion. This has the effect of preventing further spectral broadening, even though this pulse is at a minimal duration (i.e., transform limited). Note further that with respect to an optical pulse in an AD waveguide—if no soliton is generated as a result of insufficient pulse energy—the pulse will first compress and then stretch with a reversed temporal chirp, resulting in spectral clamping as with the normal dispersion case.

Advantageously, with our approach according to aspects of the present disclosure, we prevent the occurrence of such "spectro-temporal stagnation" repeatedly, by alternating between ND and AD waveguide segments along the propagation. Of further advantage, supercontinuum generation according to aspects of the present disclosure may be performed at lower powers—and in particular—lower than necessary for soliton generation. Accordingly, and as will be readily appreciated by those skilled in the art, supercontinuum generation systems, methods, and structures according to the present disclosure operate in regimes that cannot be used in conventional supercontinuum generation setups as taught and disclosed in the art.

Operationally, in sections of AD we perform temporal compression to increase (maximize) the peak intensity, and to decrease (minimize) pulse duration such that SPM spectral broadening is always optimized for the segment and/or the subsequent ND segment. However, before a soliton can form, we reverse the dispersion with a ND segment, such that coherent SPM spectral broadening remains ongoing, without termination through soliton formation or a broadened temporal profile.

Depending on the specific optical materials and geometries employed, spectral broadening through SPM will occur predominantly in ND segments, in AD segments, or in both—depending upon particular configuration. For a basic illustration of the concept, we proceed only with the first case where the AD segments merely serve to temporally compress the optical pulse to, ideally, the transform limit with only negligible nonlinear contributions. SPM spectral broadening is maximized and carried out only in the ND segments. We label such a structure as an ND SCG chain. Of course, such illustrating is in now way limiting as any of the above-identified cases/scenarios are contemplated and included in the scope of the present disclosure.

Another reason for choosing this case as an illustrative example is that it exhibits a spectral coherence advantage over the other case (with strong SPM occurring in the AD segments). The reason is that modulation instabilities (MI) are absent in ND SCG, which inhibits the growth of noise via MI.

Continuing with our illustrative discussion, we assume for specificity that a transform limited Gaussian pulse serves as input into a first ND segment as such a pulse is at its minimum duration, which maximizes SPM spectral broadening. As spectral broadening occurs, the pulse accelerates its rate of temporal defocusing. This eventually results in a temporally stretched pulse having a much longer duration and lower peak intensity that inhibits SPM. At this point in its propagation through the segmented waveguide, the pulse enters an AD segment where the pulse becomes temporally re-focused to ideally its transform limit.

Temporally, the pulse can now maximize SPM and broadening in the next ND segment relative to the case where it is temporally broadened. Thus, once the point of strongest temporal focusing is reached in the AD segment, the cycle is repeated with a next ND segment for SPM spectral broadening, then a next AD segment for temporal re-focusing and so on. Accordingly, spectral broadening can be increased in steps—towards a desired bandwidth—while circumventing spectral clamping through loss of peak intensity and increased pulse duration. The dynamics of the other case (where SPM is non-negligible in the AD sections) is highly similar and according details are presented later.

Quantification of the ND SCG Case

In order to quantify the conditions that the lengths of the segments fulfill for inducing the described dynamics in a ND SCG chain, we recall the basic relations describing nonlinearity and group velocity dispersion. Ideally, for large SPM spectral broadening in the ND segments, the nonlinear length, $L_{nl}^{(ND)}$, has to be smaller than the dispersion length, $L_D^{(ND)}$, with $$L_{nl}^{(ND)} \equiv \frac{1}{\gamma^{(ND)} P_o} < L_D^{(ND)} \equiv \frac{t_o^2}{|\beta_2^{(ND)}|}.$$

Here, $t_o$ is the transform limited pulse duration ($e^{-1}$ intensity) at the input of the ND (or AD) segment, $P_o$ the input peak power, $\gamma$, is the waveguide nonlinear coefficient, and $\beta_2^{(ND)}$ is group velocity dispersion in the ND segment. For the AD segments, $\gamma^{(AD)} \to 0$, minimizing bandwidth increase in the AD segments.

Those skilled in the art will appreciate that it can be seen from the above relations that the dispersion length decreases quadratically with decreasing transform limited pulse duration (i.e., with increasing spectral width) but the nonlinear length decreases linearly. Thus, in the limit of many ND segments, when the spectrum has substantially broadened, $L_l^{(ND)}$ will become greater or equal than $L_D^{(ND)}$—always. However, it will be shown both numerically and with our experimental results that substantial spectral broadening still transpires when $L_{nl}^{(ND)}$ becomes larger or equal to $L_D^{(ND)}$.

Note that while these lengths work for the idealized case of a Gaussian input pulse with only up to second order dispersion, these length relations are paramount in deriving relevant expressions needed to optimize the SCG process in segmented waveguide chains with alternating dispersion according to aspects of the present disclosure.

For example, the minimal spectral bandwidth increase obtained in each ND segment of a ND SCG chain can be derived using the above shown characteristic length relations and it can be shown to be increasing exponentially. This result is important—not only does this SCG method according to aspects of the present disclosure bypass spectral clamping in dispersive media, the spectral bandwidth increases exponentially, meaning that the chain need not be composed of many segments for a large spectral enhancement and in general, shows that the chain is a powerful solution to generate SCG relative to conventional methods.

To further elaborate on the above, we note that the spectral bandwidth enclosed between the $e^{-1}$ spectral intensity values ($\Delta\omega$), increases in each ND segment by at least a factor of $\sqrt{2}$, relative to the previous ND segment in the chain. For example, $\Delta\omega_N > \sqrt{2}\Delta\omega_0$, where N is the ND segment number further provided $$L_{nl}^{(ND)} < \frac{L_D^{(ND)}}{2}$$

and the ND segment length ($L_{ND}$) satisfies $L_{ND} \geq 2L_{nl}^{(ND)}$. This bandwidth increase is shown graphically in FIG. 1(B) showing an example numerical result for such a chain.

In general, as long as $L_{nl}^{(ND)} \geq L_D^{(ND)}$ our calculated lower bound of the spectral bandwidth ratio in each ND segment varies from 2.8, when $L_{nl}^{(ND)} \to 0$ to 1.1 when $L_{nl}^{(ND)} = 0.8 L_D^{(ND)}$ (provided $L_{ND} \geq 2L_{nl}^{(ND)}$).

Figure 2B:
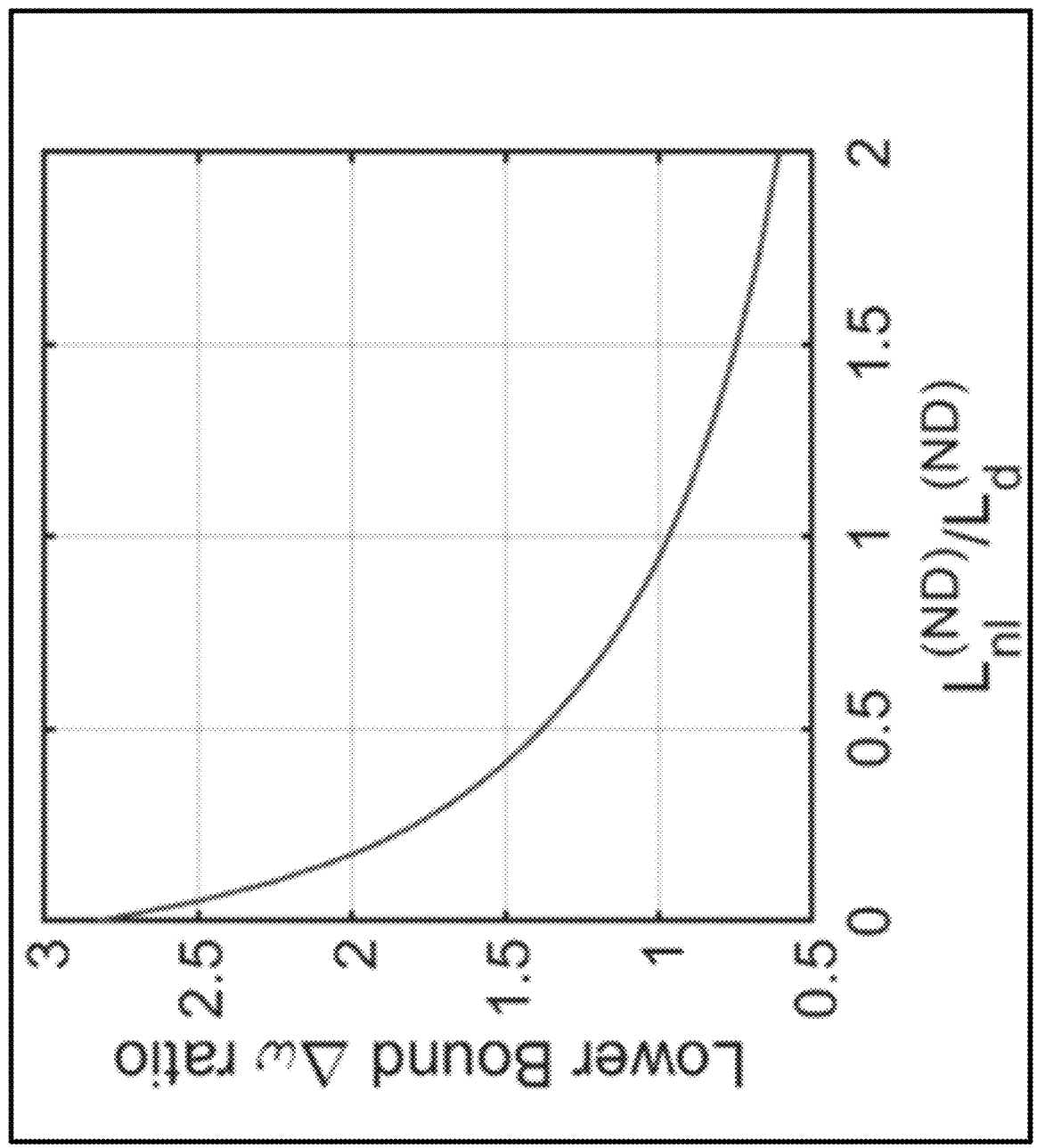
FIG. 2(B) is a plot showing the lower bound calculation for the bandwidth increase ratio between subsequent ND segments according to aspects of the present disclosure.

FIG. 2(B) displays the lower bound ratio across this range. Thus, within the range, $L_{nl}^{(ND)} \leq 0.8 L_D^{(ND)}$, $\Delta\omega_N > 1.1^N \Delta\omega_0$ and is lower bound by an exponential function.

In fact, it outperforms spectral generation in the ideal but physically unattainable case without dispersion where the bandwidth growth converges to a linear increase with propagation, with a sufficient number of ND segments. The more physically relevant uniform dispersion case saturates to a constant bandwidth past a certain $L_{ND}$ length (this length is labelled as $L_{sat}^{(ND)}$), so methods according to the present disclosure will always substantially outperform this case. In fact, if the ND segment length is chosen to be equal or greater than $L_{sat}^{(ND)}$, our method according to the present disclosure outperforms the uniform dispersion case within the first ND segment.

FIG. 2(A) is a plot illustrating the comparison of our method according to the present disclosure with these two cases in an example calculation using experimentally relevant parameters. More specifically, FIG. 2(A) is a plot showing the comparison of the spectral development in each ND segment along the propagation direction of the ND SCG chain with an equivalent length case of just the ND waveguide wherein dispersion is not present but nonlinearity remains and the equivalent length case wherein there is only a continuous length of the ND material with both dispersion and nonlinearity. Note that the dispersion chosen is considered to be within a standard range for step-index fibers and is thus not a negligible value according to aspects of the present disclosure.

Figure 2C:
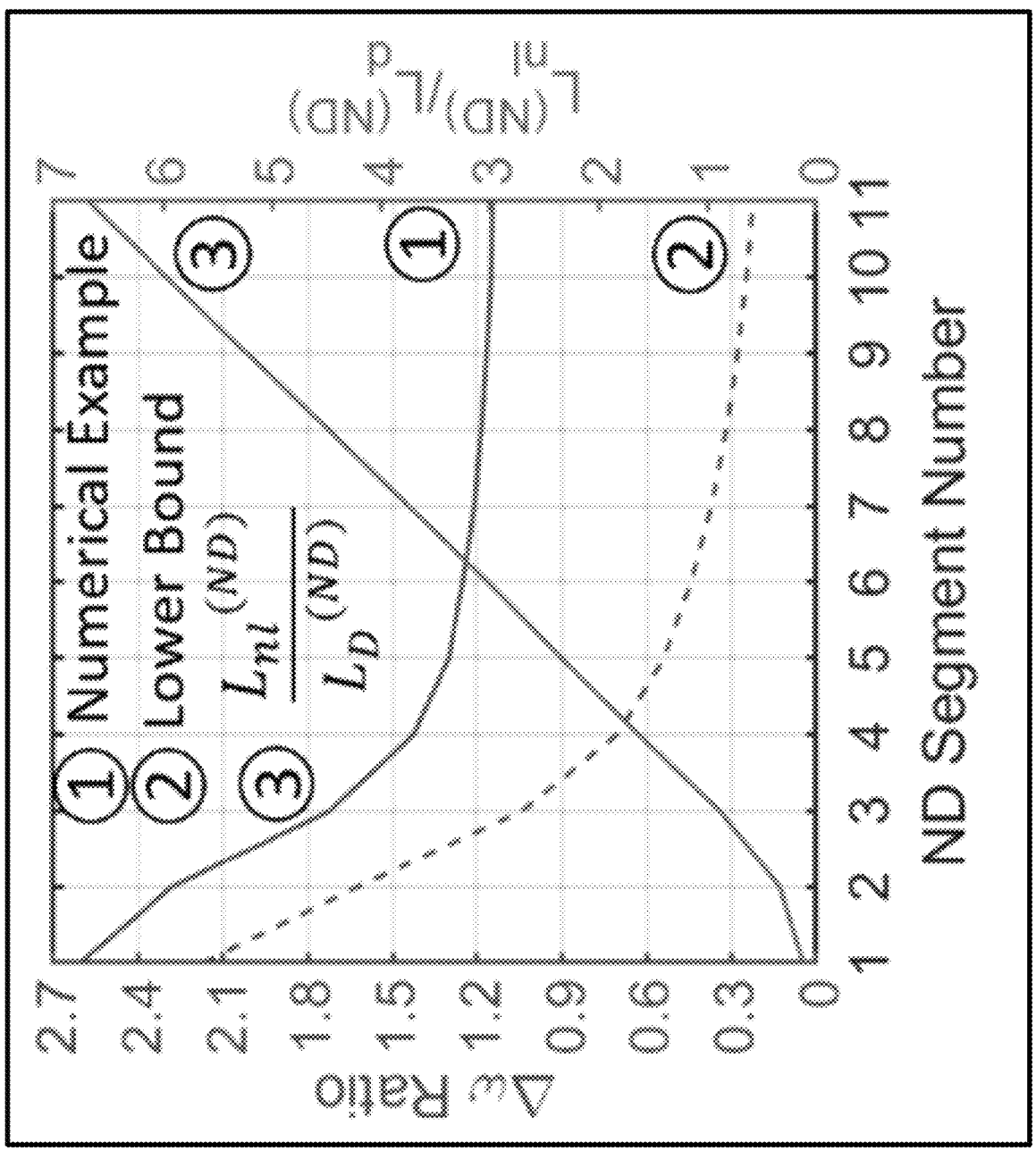
FIG. 2(C) is a plot showing the bandwidth increase ratio at the end of each ND segment (with respect to the previous segment) wherein the lower bound calculation is shown and the ratio of the nonlinear to dispersion length of at the start of each progressive ND segment is shown according to aspects of the present disclosure.

FIG. 2(C) shows graphically the comparison of this example calculation with the lower bound spectral ratio estimation. More particularly, FIG. 2(C) is a plot showing the bandwidth increase ratio at the end of each ND segment (with respect to the previous segment) wherein the lower bound calculation is shown and the ratio of the nonlinear to dispersion length of at the start of each progressive ND segment is shown according to aspects of the present disclosure.

We note that the power of this lower bound estimate is not only to show the spectral bandwidth increases greater than an exponential function within a certain domain of interest but it can be used as a tool in the design of these chains to obtain the nonlinear lengths needed to guarantee a certain bandwidth increase dynamic (and thus, a certain end bandwidth). However, the estimate itself is strict and for $L_{nl}^{(ND)} > 0.8 L_D^{(ND)}$ it is lower than one (e.g., shown in FIG. 2(B)). While it is still true in the sense of a lower bound it becomes physically meaningless, since the spectrum should always increase under the conditions of the ND SCG chain. For $L_{nl}^{(ND)} \geq L_D^{(ND)}$, it is expected that spectral increases will still happen albeit not bounded by one exponential function in the entire domain. This is shown in the example case of FIG. 2(C). In fact, as shown in FIG. 2(A) and FIG. 2(C), the alternating waveguide structure overcomes the case where there is no dispersion and just SPM in later ND chain segments when $L_{nl}^{(ND)} \geq L_D^{(ND)}$. This will be demonstrated experimentally at a later point of this disclosure.

To make the above more precise, FIG. 2(C) shows that the bandwidth ratio of subsequent ND segments in the chain remains substantially higher than the lower bound estimate and higher than 1.4 even for $L_{nl}^{(ND)} \gg L_D^{(ND)}$. Furthermore, the ratio stays greater than 1.1 even for $L_{nl}^{(ND)} \approx 7 L_D^{(ND)}$. As well, the chain outperforms the no dispersion case (shown in FIG. 2(A)) past ND segment numbers where $L_{nl}^{(ND)} > L_D^{(ND)}$. This numerical example then shows that the ND SCG chain can also work in the limit of low peak intensity where dispersion dominates over the nonlinearity of the material. Thus, the ND SCG chain has the additional advantage that it overcomes spectral clamping for low peak intensity laser inputs and thus, SCG can be generated at even these low peak intensities when the nonlinear length is far greater than the dispersion length. Thus, the alternating chain not only can advantageously overcome ND spectral clamping but can make SCG accessible to the low peak intensity laser regime.

Description of AD SCG and Mixed Case

Another important case is when the main contribution to spectral broadening through self-phase modulation occurs in the anomalous dispersive segments in the chain (i.e., an AD SCG chain). In such a situation, nonlinear temporal compression takes place in the AD segments, and due to the rising peak intensity and reduced duration, SPM expands the spectral bandwidth. However, past a certain propagation length in the AD segment either the pulse moves past its temporal focus, inverting the direction of its temporal chirp and leading to SPM spectral narrowing or soliton formation takes place and ceases any substantial coherent spectral bandwidth increase (i.e., clamps the spectrum). Thus, the length of each AD segment is chosen such that before these two processes take place the pulse enters an ND segment where it is temporally defocused and chirped. After the ND segment, in the subsequent AD segment, the pulse is not at its temporal focus nor is it close to the short duration, high peak intensity profile needed to couple into solitons. Consequently, spectral generation takes place as the pulse is temporally compressing from its dispersed chirped profile. Again, before it compresses to the point where soliton fission or temporal chirp inversion takes place, the AD segment is terminated. In this manner, spectral generation can continue in an unclamped fashion in the chain just by the addition of AD-ND cycles.

Since, the material dispersion increases SPM spectral broadening in the AD SCG process before spectral clamping occurs, AD SCG has a higher spectral bandwidth than ND SCG, where material dispersion always works to counter SPM spectral broadening. Thus, the AD SCG chain variant may require less chain cycles to generate a desired spectral bandwidth relative to the ND SCG chain counter-part. As well, this method generates SCG even when the input pulse energy is below the fundamental soliton energy which is needed to initiate SCG in conventional setups. Therefore, as in the ND SCG chain variant of the method, the AD SCG chain not only overcomes AD spectral clamping processes but renders SCG accessible to low pulse energy regimes that are below the cut off needed for SCG in conventional AD SCG waveguides.

Note that the last case is that spectral generation is substantially done in all segments and they (ND or AD segment) mutually prevent each other's spectral clamping mechanisms (i.e., AD and ND SCG spectral clamping mechanisms).

Experimental Setup and Results

To demonstrate systems, methods, and structures for SCG experimentally, a fiber-based wave guiding was chosen to realize a ND SCG chain, because fibers enable easy control of the length of the segments to optimize the SCG. Additionally, the fibers can be joined relatively easily using a commercial splicer and cleaver. Accordingly, fibers were chosen such that the ND SCG chain case could be quickly and conveniently demonstrated experimentally.

Figure 3:
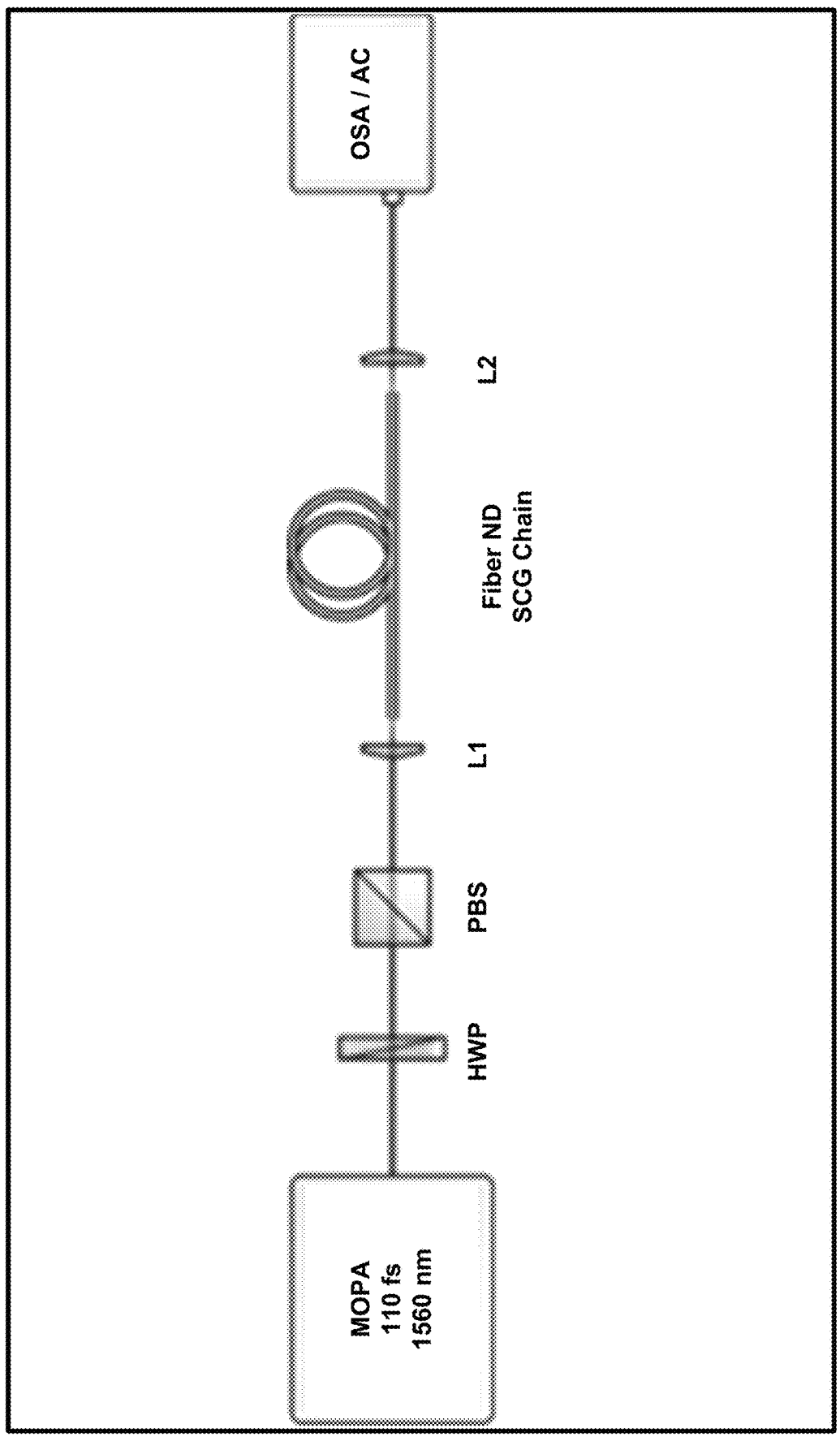
FIG. 3 is a schematic diagram illustrating an experimental setup for supercontinuum generation according to aspects of the present disclosure.

Experimental Setup: The illustrative experimental setup, shown schematically in FIG. 3, comprises a source for generating ultra-short optical pulses which are injected into a chain of fiber segments for SCG. The source includes a commercially available, passively mode-locked Erbium doped fiber laser, amplifier and a temporal compressor system.

Operationally—and for the purposes of our experimental purposes and in no way limiting the scope of our disclosure—pulse parameters of a pulse entering the fiber chain are a 74 fs FWHM pulse duration, 50 mW average power at a 79.9 MHz repetition rate, at a central wavelength of 1560 nm. The power coupled into the fiber was 35.6 mW (446 pJ pulse energy).

Segments of standard single-mode doped-silica step-index optical fiber (Corning Hi1060flex for ND, Corning SMF28 for AD) were used. This has the benefit of providing well-characterized dispersion properties, see FIG. 4, and nonlinear properties, which makes numerical modeling and comparison with experimental data more reliable. These specific single mode fibers were chosen due to their sign-inverted second order dispersion relative to each other in the wavelength region of the pump laser, the high nonlinear coefficient of the ND fiber, and because low splice loss can be achieved between them.

Figure 4:
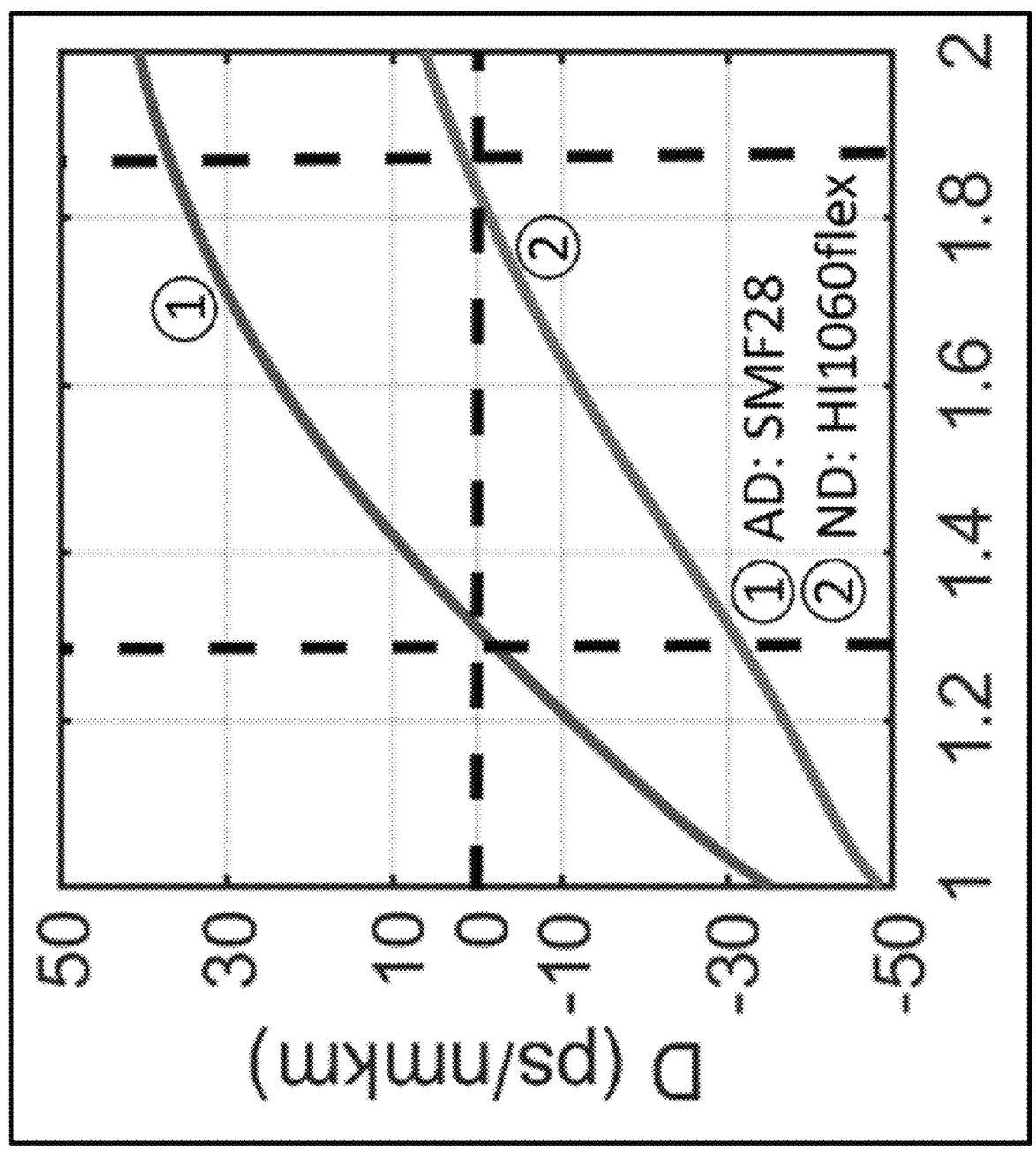
FIG. 4 is a plot illustrating second-order dispersion vs. wavelength of experimentally used AD and ND fiber segments in which the vertical dotted lines indicate the zero dispersion wavelengths of the AD (1.31 µm) and ND (1.83 µm) segments according to aspects of the present disclosure.

As may be observed, FIG. 4 is a plot illustrating second-order dispersion vs. wavelength of experimentally used AD and ND fiber segments in which the vertical dotted lines indicate the zero dispersion wavelengths of the AD (1.31 µm) and ND (1.83 µm) segments according to aspects of the present disclosure.

For the first ND segment, we obtain $L_{nl}^{(ND)} \approx 4.1$ cm and $L_D^{(ND)} \approx 10.1$ cm, satisfying $$L_{nl}^{(ND)} < \frac{L_D^{(ND)}}{2}.$$

However, it is not guaranteed that this inequality is maintained for all subsequent ND segments since $L_D^{(ND)}$ reduces faster with decreasing pulse duration. In fact, in our experiment, $L_{nl}^{(ND)} > L_D^{(ND)}$ past the $3^{rd}$ ND segment, however, it is shown in the results that spectral bandwidth increase still takes place.

Experimental Procedure: The experiment was performed by starting with a 25 cm piece of the ND fiber, and measuring the spectrum from its output using an OSA. The length was shortened (cut) until a slight reduction of the spectral width became noticeable (e.g., at the −30 dB level). This ensures that the fiber length is within the length where the spectral generation is ongoing and not clamped. Past this length, the spectral generation clamps (i.e., it is negligible with magnitudes less than −30 dB), as discussed above due to the dispersive temporal defocusing.

Shortening the fiber to this length disrupts further pulse defocusing thus minimizing phase contributions from higher order dispersion, however, without disrupting the spectral generation. It is important to remove such phase contributions to achieve better pulse compression in the following AD segment because, in our demonstration, the AD fiber cannot completely compensate for the high order dispersion of the ND fiber and thus cannot compensate for this.

Next, a 20 cm piece of AD fiber is spliced to the ND fiber and the pulse duration is measured with an intensity auto correlator (APE Pulse Check). The fiber shortened until the autocorrelation trace (AC) indicates a minimum pulse duration, i.e., that the temporal focus lies at the output facet. The procedure is then repeated with the next piece of ND fiber and so forth.

Results and Discussion

Figure 5:
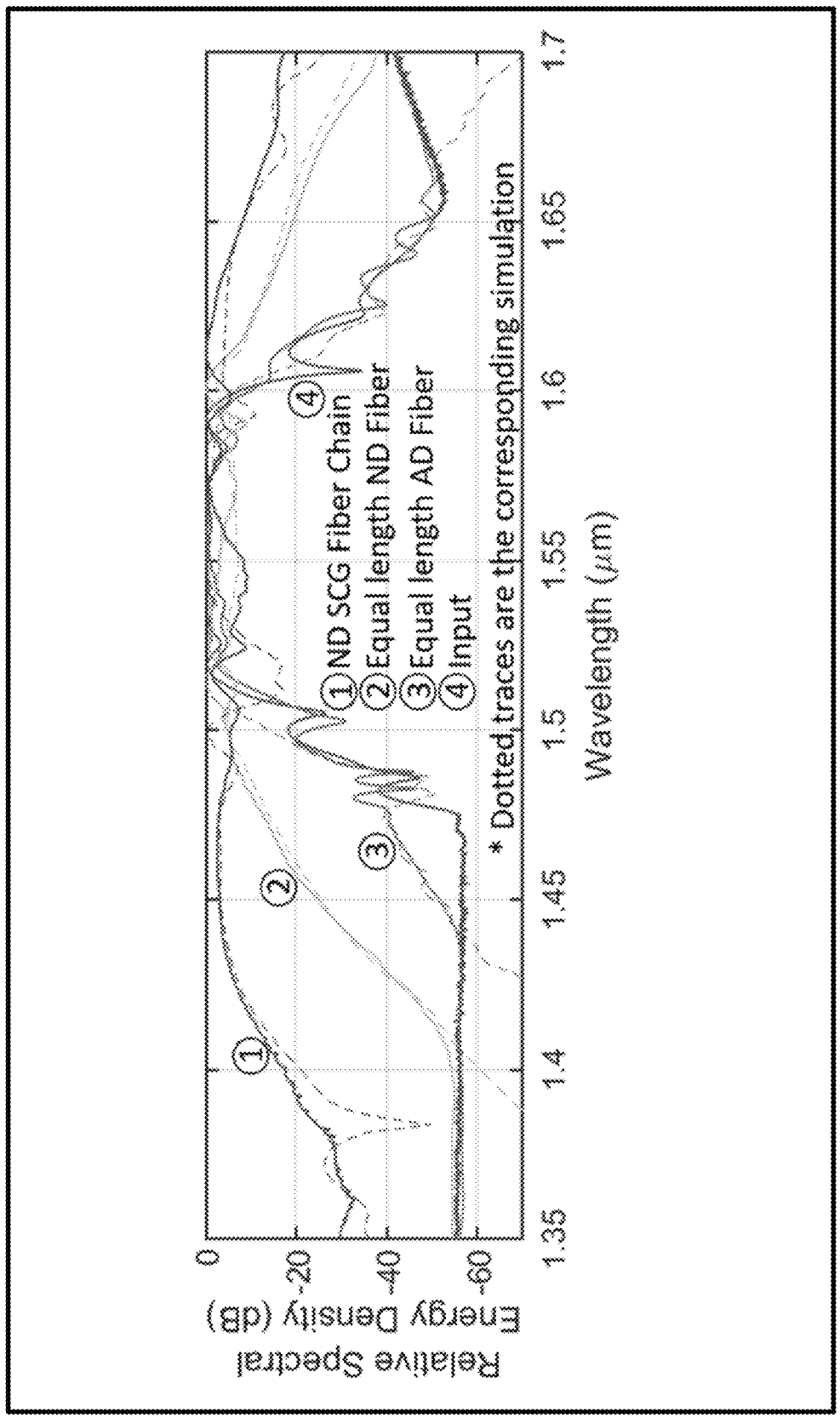
FIG. 5 is a plot illustrating measured power spectrum obtained from supercontinuum generation in a segmented chain fiber waveguide in which—for comparison—the measured spectra obtained with the same length of normally dispersive (ND) fiber and anomalous dispersion (AD) fiber are displayed as well as obtained with the same pulse input parameters, also a numerical simulation, according to aspects of the present disclosure.

Spectral and Temporal Evolution of ND SCG Fiber Chain: The experimental results are shown in FIG. 5, which is a plot illustrating measured power spectrum obtained from supercontinuum generation in a segmented chain fiber waveguide in which—for comparison—the measured spectra obtained with the same length of normally dispersive (ND) fiber and anomalous dispersion (AD) fiber are displayed as well as obtained with the same pulse input parameters, also a numerical simulation, according to aspects of the present disclosure.

As may be observed and understood by those skilled in the art, a significant increase of the spectral bandwidth is realized—as compared to fibers with equal length of nonsegmented ND and AD fiber. Also, shown is the result of theoretical modelling based on numerically solving the generalized nonlinear Schrodinger equation. The theoretical prediction supports the experimental data, namely, that there is a large bandwidth enhancement for the ND SCG alternating chain. FIG. 5 also shows numerically and experimentally that, compared to the input pulse, there was negligible spectral generation in the AD fiber, proving that this type of fiber chain is operating within the regime of the ND SCG dominated chain case, i.e., spectral generation predominantly occurs in the ND segments.

At this point those skilled in the art will readily appreciate that supercontinuum generation according to aspects of the present disclosure resulting from alternating dispersion as now taught and disclosed is realizable, practical, and surprisingly effective.

These results provide, to our knowledge, the first demonstration of this novel method of SCG: From the substantial relative bandwidth increase of the spectrum obtained with the chain versus the clamped spectrum of the ND fiber of the same length, this chain fiber system advantageously circumvents the spectral clamping that occurs in ND fiber SCG through loss of peak intensity.

For example, the $e^{-1}$ spectral width of 233 nm for the chain is a factor 1.7 wider than with the ND fiber and a factor of 2.7 than with the AD fiber. This spectral enhancement was obtained with an additional loss of 49% within the fiber chain over the reference fibers, thus making this significant enhancement even more substantial since it is effectively obtained at half the available power.

The experiment also demonstrated that the spectral bandwidth growth can take place for $L_{nl}^{(ND)} > L_D^{(ND)}$ even at early segments in the ND SCG chain (i.e., at the $3^{rd}$ ND segment in the fiber chain).

Moreover, of considerable importance is that the experiment demonstrated that—provided they have opposite sign—the alternating ND-AD dispersion parameter profiles need not be strict to a specific arrangement with respect to higher order dispersion parameters (i.e., greater than second order). Rather, the chain is robust to deviations in the dispersion parameter shapes. This is elaborated more in the next paragraph and the next section.

Figure 6A:
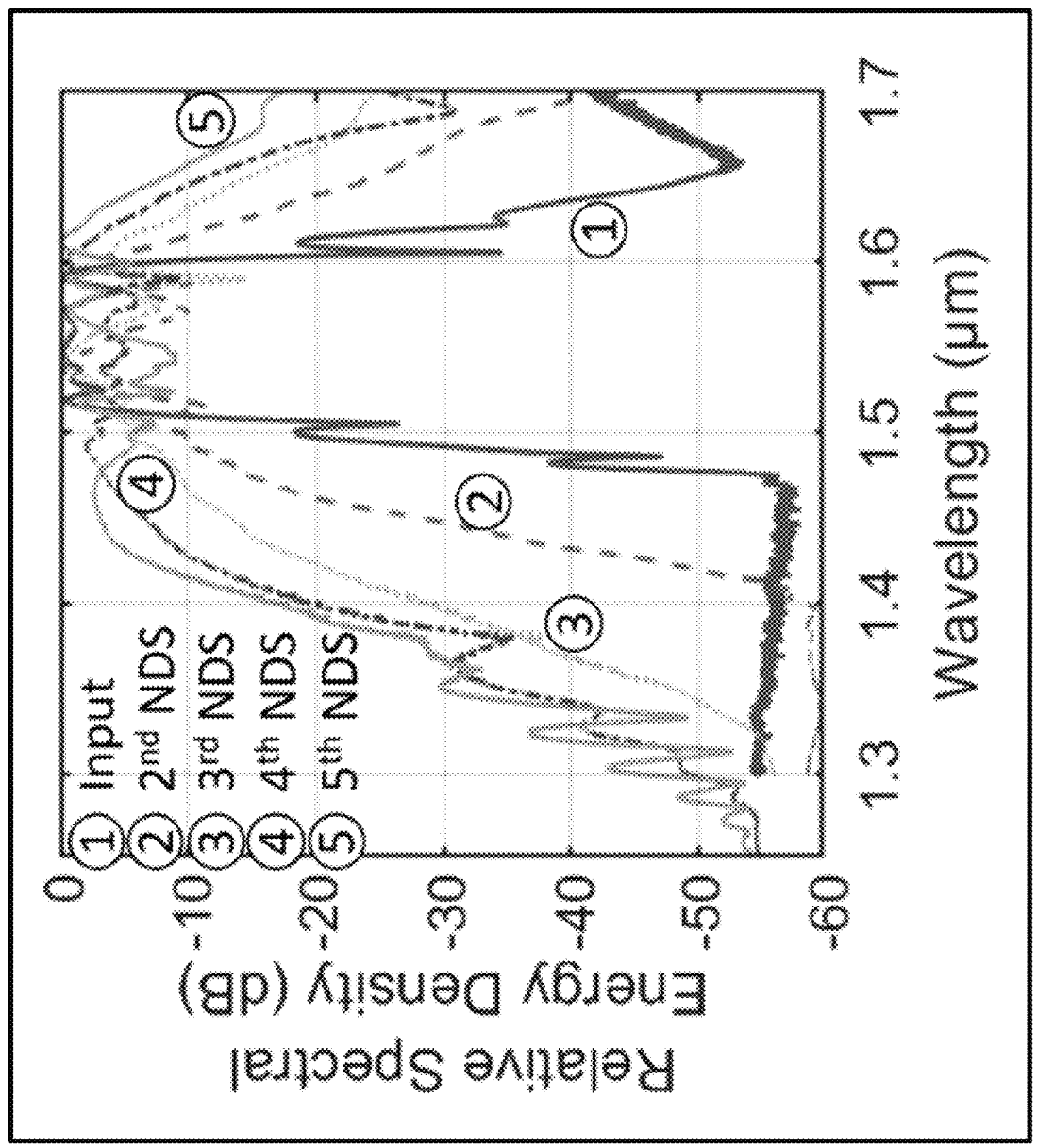
FIG. 6(A) is a plot illustrating relative spectral energy density (dB) vs. wavelength (µm) for an output spectrum measured behind each ND segment in the chain according to aspects of the present disclosure.
Figure 6B:
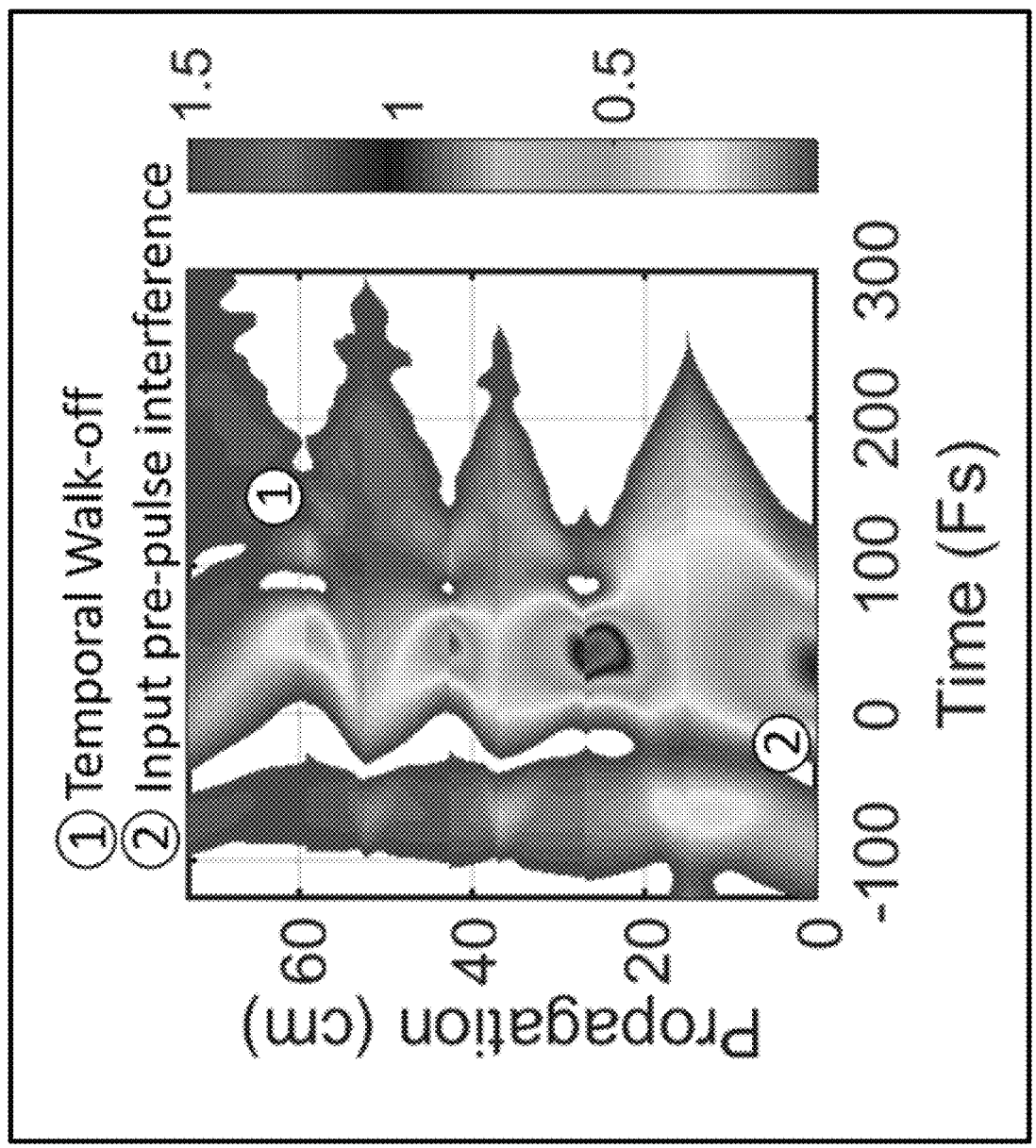
FIG. 6(B) is a plot illustrating relative pulse intensity (color coded) and temporal shape (Fs) vs. propagation distance (cm) vs. time (fs) in which the time coordinate is taken in a frame moving with group velocity according to aspects of the present disclosure.

FIG. 6(A) is a plot illustrating relative spectral energy density (dB) vs. wavelength (μm) for an output spectrum measured behind each ND segment in the chain according to aspects of the present disclosure; and FIG. 6(B) is a plot illustrating relative pulse intensity (color coded) and temporal shape (Fs) vs. propagation distance (cm) vs. time (fs) in which the time coordinate is taken in a frame moving with group velocity according to aspects of the present disclosure.

With simultaneous reference to those figures, it may be understood that FIG. 6(A) shows a more detailed set of experimental data, i.e., the spectral development while FIG. 6(B) shows theoretical data of the temporal development of the SCG vs propagation through the growing number of these fiber segments. Furthermore, it can be seen that the spectral bandwidth grows stepwise with each ND segment (see, e.g., FIG. 6(A)) while the pulse FWHM duration oscillates between about 30 fs and 175 fs (see, e.g., FIG. 6(B)) across the propagation coordinate. Both developments confirm the proper working of the novel method according to aspects of the present disclosure.

It was also experimentally verified that the last AD segment was able to compress the pulses to an auto correlated value of 46 fs (~33 fs) FWHM which is a substantial additional advantage to the alternating chain SCG and of potential use to practical SCG experiments; at the output of the chain, if terminated by an AD segment, the SCG pulse is already in a temporally compressed form. To our knowledge, we have not found an all fiber SCG system that compresses the output pulse to sub 50 fs durations at this central wavelength with these fibers exhibiting unmatched in magnitude higher than second order dispersion coefficients (i.e., unmatched higher order dispersion).

We note that the last (fourth) ND segment provided a $e^{-1}$ spectral bandwidth ratio of 1.28 relative to the previous segment. This exceeds expectations given that $L_{nl}^{(ND)} \gg L_D^{(ND)}$. However, at this ND segment number the spectral increase starts to slow. Ultimately, the spectral increase in subsequent segments in this fiber chain rendition are limited due to the loss of peak intensity from uncompensated spectral phase and cumulative splice losses.

In a practical implementation of the ND SCG chain, the dispersion parameter profiles of the two segments do not have opposite signs across the entire spectral range of relevance. Past a certain bandwidth, uncompensated spectral phase arises because the dispersion parameter, D of the ND fiber and AD fiber has the same sign. This ultimately creates an increasing temporal separation for radiation in this spectral region (temporal walk-off), a continuous temporal broadening of this radiation and a lowering of the overall temporal peak intensity. This limits not only spectral generation in this region but the overall spectral generation.

We note that this is a technical limitation in our experiment. Specifically, because of this, it is expected that the spectral generation should be clamped, near the two zero dispersion wavelengths (ZDWs) of the AD and ND segments at 1.31 μm and 1.83 μm (shown in FIG. 4) i.e, the largest possible bandwidth at the $e^{-1}$ level is the range between the two ZDWs. When these endpoints are approached, the spectral growth in additional ND segments would cease.

As well, within the spectral range where the signs of D are opposite between the ND-AD segments, spectral phase build up still occurs. This is because the AD fiber segments introduce higher than second order dispersion (the ND segments higher order dispersion contributions are less substantial, as discussed in the next section). This results in an uncompensated spectral phase after each ND-AD segment cycle that builds up within the range between the ZDWs. This also results in the lowering of the peak intensity and temporal walk off into sub-pulses (centered at different central wavelengths). However, this occurs after many chain segments, being a higher order dispersion effect, and it may be that the chain is rather resilient to this process (see next section). Evidence of these processes are highlighted in FIG. 6(B).

The impact of Higher Order Dispersion and Ideal Dispersion Parameters: The impact of higher order (i.e., higher than second order) spectral phase contributions due to SPM contributes less to its overall spectral phase contribution. The second order phase contribution of SPM dominates since higher order contributions mainly arise from the spectral contributions of the wings of the temporal pulse, where the SPM chirp decreases back to the original carrier frequency of the pulse (here we assume close to Gaussian pulses). As such, these contributions can be treated as negligible due to the low amount of energy captured in the wings of the pulse relative to the main portion (within the $e^{-1}$ temporal width).

As will be readily appreciated by those skilled in the art—and of particular advantage for systems, methods, and structures according to aspects of the present disclosure— the AD segments need only compensate for this second order phase contribution (which is chirped in the same direction as the ND dispersion phase function and opposite to the AD dispersion phase function). This can easily be accounted for by adjusting the length of the AD section thereby matching the magnitude of its group delay dispersion (GDD) coefficient.

We note that the higher order dispersion of the ND segment can be effectively ignored in ND segments where large SPM spectral broadening occurs, since the dispersive phase contribution is continuously stretched over the increasing spectral bandwidth. If the ND segment length is discontinued (too short) before spectral clamping in that segment occurs, the dispersive phase contributions are effectively divided over a larger bandwidth. This would have the effect that the GDD introduced by the ND segment is lower and its higher order phase contributions even lower. Thus, in the beginning chain cycles, the spectral generation is robust to the higher order dispersion of the ND segment (all that counts is that the second order dispersion coefficient between the two segments has opposing signs for pulse compression). Therefore, since the dominant higher order phase contributions are from the higher order dispersion of the AD segment, a group velocity dispersion (GVD) parameter profile that has minimum higher order dispersion is ideal (i.e., flat).

When spectral generation in later ND chain segments becomes less dominant (i.e., $L_{nl}^{(ND)} > L_D^{(ND)}$) or when the length of the ND segments are larger than the spectral saturation length, it is then ideal to have mirror reflected dispersion parameter (or GVD) profiles about the spectral-axis between the AD and ND fiber segments (determined to an arbitrary constant that can be set by the length of the AD segment).

We note however—in the experiment—the dispersion parameter profiles of the AD and ND fiber segments are neither spectral-axis mirror reflected profiles of each other nor does the AD dispersion parameter profile correspond to a flat GVD along the spectral range of interest (in fact, it deviates considerably from this). Yet it was experimentally observed that the alternating chain had a significant spectral enhancement relative to the reference fibers. As well, a pulse duration of 33 fs was experimentally verified at the last AD segment of our fiber chain. This temporal compression is unprecedented with such fiber segments in general and thus verifies convincingly that the chain is robust to the specific dispersion parameter shapes (provided the signs alternate).

This may be explained by the fact that while the profiles are far from ideal, the opposing dispersion parameter signs (and that the segment lengths vary along the chain) render that some SPM generated spectral components can "orbit" around the nonlinearly interacting main pulse (or sub-pulses) and at positions along the propagation coordinate overlap again with the main radiation (perhaps after a set amount chain cycles later in the chain). Thus, they may then still contribute to spectral generation, through XPM with the main pulse, resulting in spectral bandwidth generation, and/or that these spectral components shift their frequencies to places along the dispersion curve where the spectral phase is better compensated between the alternating segments. This orbital dynamic of these spectral components results in the peak intensity being maintained for a larger amount of chain segments and less affected by uncompensated spectral phase along the propagation coordinate and an ongoing spectral generation. This results in the chain being rather robust to the specific shape of the component segment dispersion parameter profiles and just strict to the fact the dispersion signs alternate between these segments.

Of particular importance from the results of the experiment is that the method is robust to these higher than second order phase processes as can be seen by the large spectral enhancement and the temporal pulse compression achieved, but nevertheless these processes, especially the higher order dispersion of the AD segments, can influence the spectral generation (for example the dynamics of the bandwidth increase ratio) after many chain cycles.

Conclusions

We have now disclosed and presented a novel approach towards wave guided supercontinuum generation which overcomes fundamental limitations of current methods. Via alternating the waveguide dispersion between normal dispersive and anomalous in segments of suitable length along the propagation direction spectral clamping in SCG can be overcome, while maintaining coherent generation. As well, SCG can be extended to low peak powers, arbitrarily lower than what is conventional using this approach.

We have explored and discussed in detail the case where SCG occurs predominantly in the normally dispersive segments both theoretically and experimentally. We found that under ideal conditions, even in the presence of typical waveguide (fiber) dispersion the spectral bandwidth enhancement can exceed the case where there is no dispersion. We also derived lower bound estimates that can aid in the design of such alternating waveguides. We demonstrate the novel approach experimentally using segments of standard normal dispersion and anomalous dispersion fiber spliced in a chain. We generated a SC spectrum with substantially higher bandwidth than with the equivalent length of fiber using only normal dispersion or anomalous dispersion. We also found that the fiber chain is rather robust to higher than second order dispersion of the segments and a high spectral enhancement and pulse compression can still be achieved.

We note that our calculations and/or experiments that we have performed indicate that AD segment length converges to a fixed length with increasing chain cycles. Since the ND segment length can be configured to be constant this means that for alternating segment chain cycles sufficiently large, the segment lengths would approach a periodic arrangement. As will be understood and appreciated by those skilled in the art, this makes systems, methods, and structures according to the present disclosure compatible with repeated nonlinear generation as in a resonator. For example—and in no way limiting—one could configure a system in which an end of the alternating segment chain is looped back to a portion of the chain at which periodic convergence of segment lengths begin. Alternatively, if one accepts the reduced spectral generation per chain segment that would be present in a beginning portion of the chain with a periodic structure, one could use the entire chain as an alternating dispersion resonator for controlling Kerr-comb generation in integrated optical resonators.

Figure 7A:
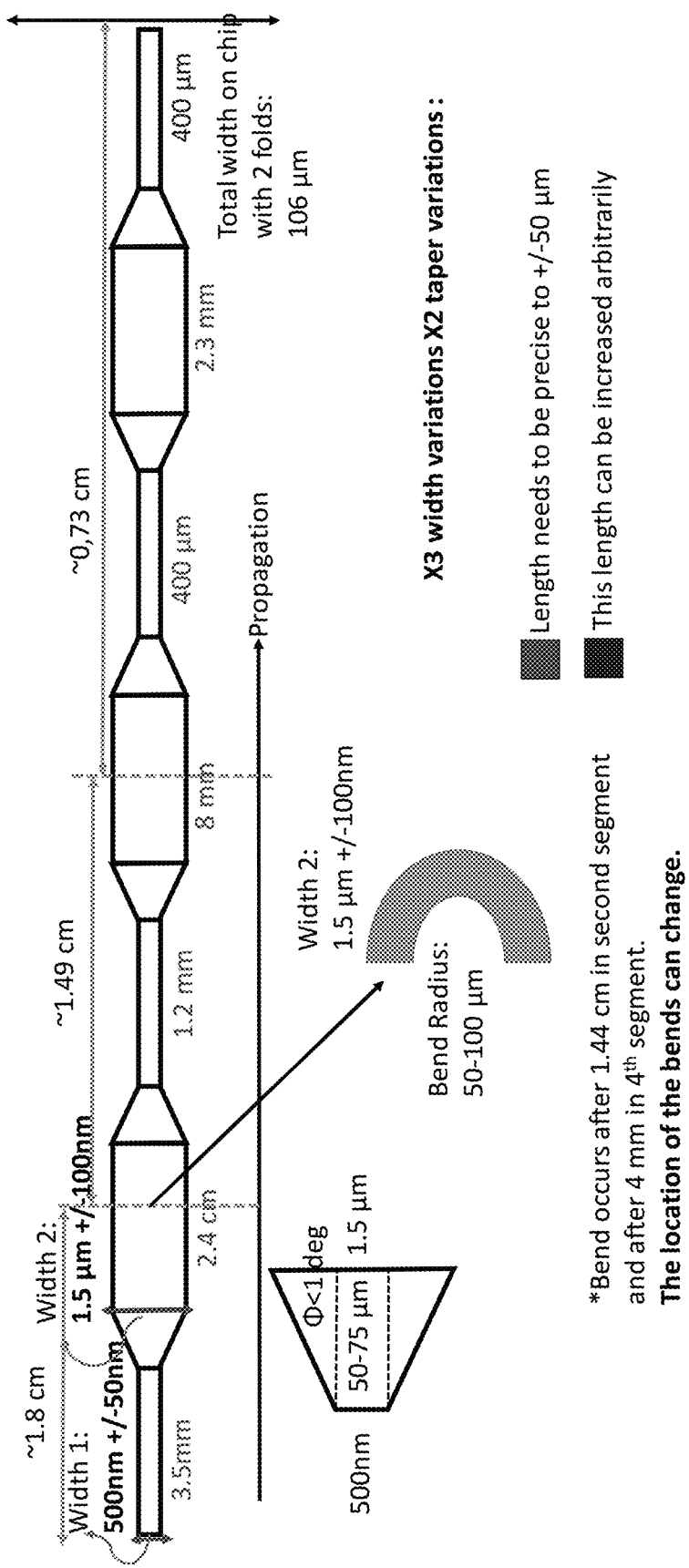
Figure 7B:
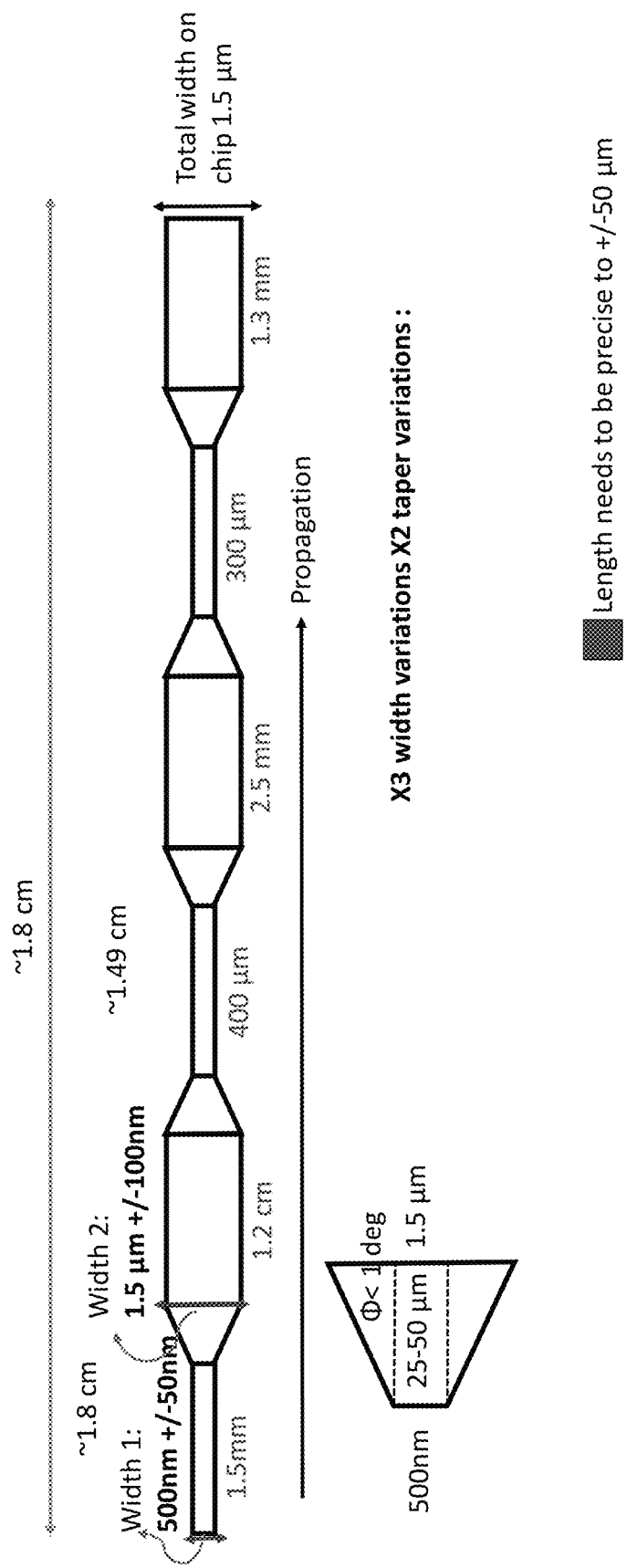
Figure 7C:
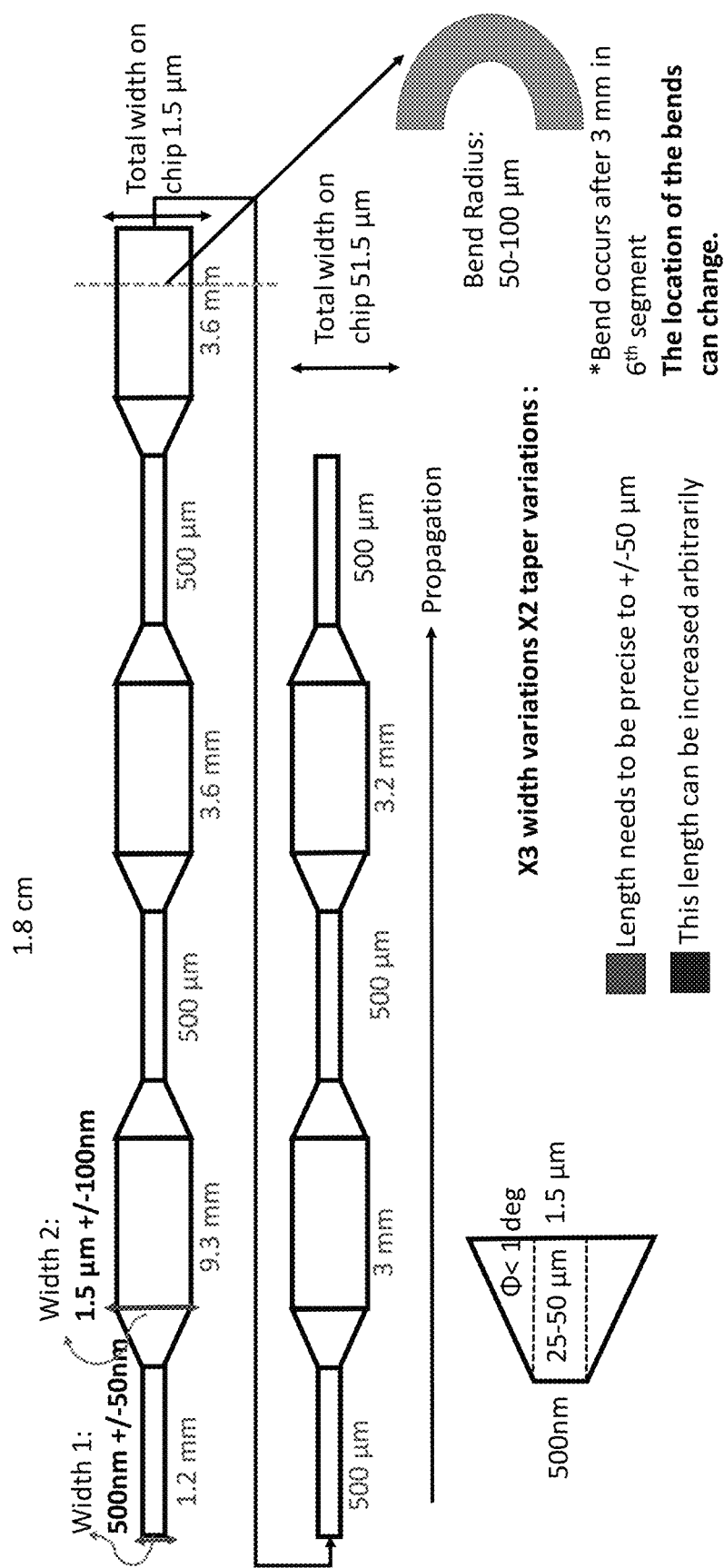
Figure 7D:
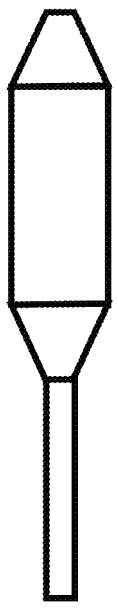
Figure 7E:
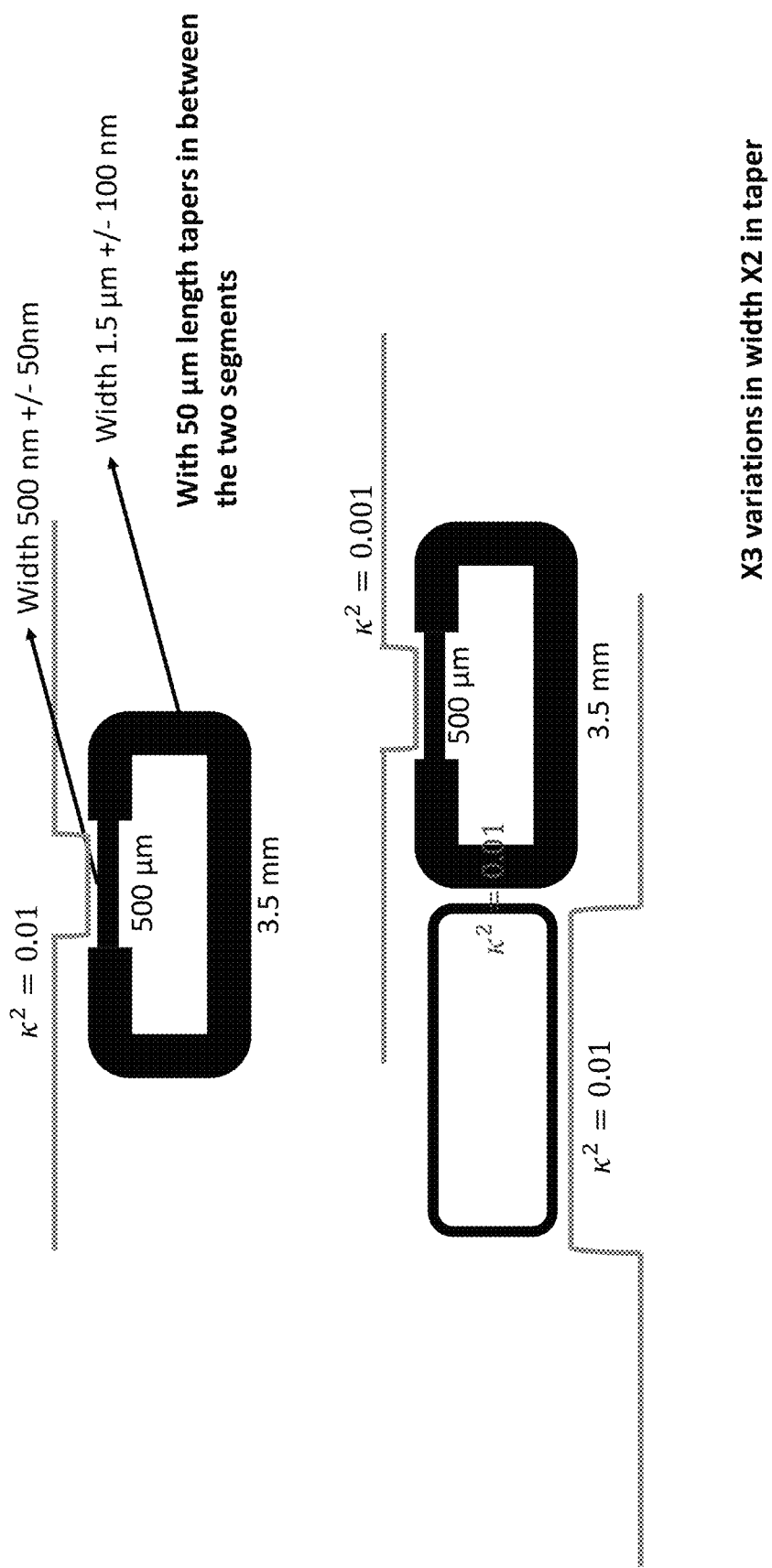

Finally, we note once more that systems, methods, and structures according to aspects of the present disclosure may advantageously take advantage or or otherwise employ silicon photonics technologies, methodologies, and/or materials and be included into integrated systems, and structures. FIG. 7(A)-FIG. 7(E) are schematic diagrams of illustrative waveguide configurations providing SCG of optical pulses that may advantageously and illustratively implemented in integrated waveguide structures employing contemporary processes and materials according to aspects of the present disclosure in which: FIG. 7(A) is a first case illustrative configuration; FIG. 7(B) is a second case illustrative configuration; FIG. 7(C) is a third case illustrative configuration; FIG. 7(D) shows illustrative parameters of waveguide structures; a plot illustrating relative spectral energy density (dB) vs. wavelength (μm) for an output spectrum measured behind each ND segment in the chain according to aspects of the present disclosure; FIG. 7(E) shows cross-sectional views of illustrative waveguides;—all according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A waveguide structure for supercontinuum generation CHARACTERIZED BY:
   alternating segments of normal dispersion (ND) waveguide segments and anomalous dispersion (AD) waveguide segments along a length of the waveguide structure;
   wherein the alternating segments are configured such that spectral generation of optical pulses traversing the structure is effected in the ND segments and spectral bandwidth increase in the AD segments is less than or equal to 10% relative to spectral bandwidth increase in the preceding ND segment.

2. The waveguide structure of claim 1 FURTHER CHARACTERIZED BY:
   the absence of spectral clamping of the optical pulses.

3. A waveauide structure for supercontinuum generation CHARACTERIZED BY:
   alternating seaments of normal dispersion (ND) waveguide segments and anomalous dispersion (AD) waveguide segments along a length of the waveguide structure;
   wherein the alternating segments are configured such that spectral generation of optical pulses traversing the structure is effected in the AD segments and spectral bandwidth increase in the ND segments is less than or equal to 10% relative to spectral bandwidth increase in the preceding AD segment.

4. The waveguide structure of claim 3 FURTHER CHARACTERIZED BY:
   the absence of spectral clamping of the optical pulses.

5. A waveguide structure for supercontinuum generation CHARACTERIZED BY:
   alternating segments of normal dispersion (ND) waveguide segments and anomalous dispersion (AD) waveguide segments along a length of the waveguide structure;
   wherein the alternating segments are configured such that supercontinuum spectral generation of optical pulses traversing the structure is effected in both AD and ND segments, and wherein the pulses are temporally compressed in one of the segment types and temporally expanded in the other one of the segment types and spectral clamping is absent in both segment types and where spectral bandwidth increase in neighboring AD and ND segments are both more than 10%.

6. The waveguide structure of claim 1 FURTHER CHARACTERIZED BY:

$$L_{nl} \equiv \frac{1}{\gamma P_o}, L_D \equiv \frac{t_0^2}{|\beta_2|};$$

wherein $t_o$, is the transform limited pulse duration (FWHM intensity) of an optical pulse applied at the input of the AD or ND segment, $P_o$ is the input peak power, $$\gamma = k_o \frac{n_2}{A_{\textit{eff}}},$$

is the nonlinear coefficient, where $k_o$ is the free-space wavenumber, $n_2$ is the Kerr nonlinear refractive index, $A_{\textit{eff}}$ is the effective mode area in the segment at the central frequency, and)$\beta_2$ is the AD or ND segment dispersion coefficient.

7. The waveguide structure of claim 1 wherein the alternating segments are configured such that the spectral bandwidth of optical pulses traversing the waveguide structure are increased and the spectral bandwidth increase in a succeeding AD segment is less than 10% relative to the spectral bandwidth increase in the preceding ND segment.

8. The waveguide structure of claim 1 wherein the alternating segments are configured such that the spectral bandwidth of optical pulses traversing the waveguide structure are increased and the spectral bandwidth increase in a succeeding ND segment is less than 10% relative to the spectral bandwidth increase in the preceding AD segment.

9. The waveguide structure of claim 1 wherein the alternating segments are configured such that the spectral bandwidth of optical pulses traversing the waveguide structure are increased and the spectral bandwidth increase in both AD and ND segments is more than 10% relative to the spectral bandwidth increase in the preceding segment.

10. The waveguide structure of claim 3 FURTHER CHARACTERIZED BY:

$$L_{nl} \equiv \frac{1}{\gamma P_o}, L_D \equiv \frac{t_0^2}{|\beta_2|};$$

wherein $t_o$ is the transform limited pulse duration (FWHM intensity) of an optical $$\gamma = k_o \frac{n_2}{A_{\textit{eff}}},$$

pulse applied at the input of the AD or ND segment, $P_o$ is the input peak power, is the nonlinear coefficient, where $k_o$ is the free-space wavenumber, $n_2$ is the Kerr nonlinear refractive index, $A_{\textit{eff}}$ is the effective mode area in the segment at the central frequency, and $\beta_2$ is the AD or ND segment dispersion coefficient.

11. The waveguide structure of claim 3 wherein the alternating segments are configured such that the spectral bandwidth of optical pulses traversing the waveguide structure are increased and the spectral bandwidth increase in a succeeding AD segment is less than 10% relative to the spectral bandwidth increase in the preceding ND segment.

12. The waveguide structure of claim 3 wherein the alternating segments are configured such that the spectral bandwidth of optical pulses traversing the waveguide structure are increased and the spectral bandwidth increase in a succeeding ND segment is less than 10% relative to the spectral bandwidth increase in the preceding AD segment.

13. The waveguide structure of claim 3 wherein the alternating segments are configured such that the spectral bandwidth of optical pulses traversing the waveguide structure are increased and the spectral bandwidth increase in both AD and ND segments is more than 10% relative to the spectral bandwidth increase in the preceding segment.

14. The waveguide structure of claim 5 FURTHER CHARACTERIZED BY:

the absence of spectral clamping of the optical pulses.

15. The waveguide structure of claim 5 FURTHER CHARACTERIZED BY:

$$L_{nl} \equiv \frac{1}{\gamma P_o}, L_D \equiv \frac{t_0^2}{|\beta_2|};$$

wherein $t_o$ is the transform limited pulse duration (FWHM intensity) of an optical $$\gamma = k_o \frac{n_2}{A_{\mathit{eff}}},$$

pulse applied at the input of the AD or ND segment, $P_o$ is the input peak power, is the nonlinear coefficient, where $k_o$ is the free-space wavenumber, $n_2$ is the Kerr nonlinear refractive index, $A_{\mathit{eff}}$ is the effective mode area in the segment at the central frequency, and $\beta_2$ is the AD or ND segment dispersion coefficient.

16. The waveguide structure of claim 5 wherein the alternating segments are configured such that the spectral bandwidth of optical pulses traversing the waveguide structure are increased and the spectral bandwidth increase in a succeeding AD segment is less than 10% relative to the spectral bandwidth increase in the preceding ND segment.

17. The waveguide structure of claim 5 wherein the alternating segments are configured such that the spectral bandwidth of optical pulses traversing the waveguide structure are increased and the spectral bandwidth increase in a succeeding ND segment is less than 10% relative to the spectral bandwidth increase in the preceding AD segment.

18. The waveguide structure of claim 5 wherein the alternating segments are configured such that the spectral bandwidth of optical pulses traversing the waveguide structure are increased and the spectral bandwidth increase in both AD and ND segments is more than 10% relative to the spectral bandwidth increase in the preceding segment.

* * * * *